UNITED STATES PATENT OFFICE.

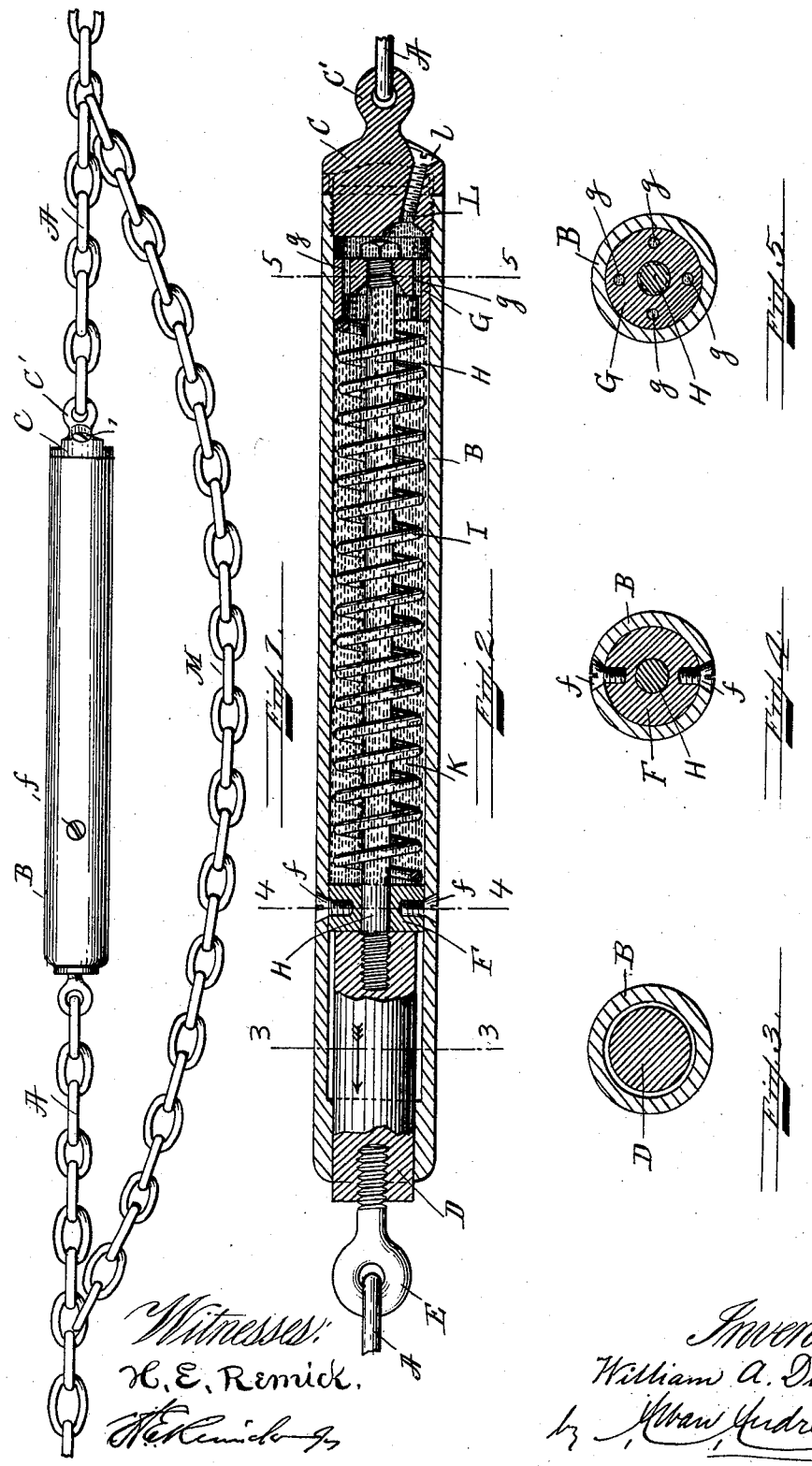

WILLIAM A. DUNCANSON, OF BROCKTON, MASSACHUSETTS, ASSIGNOR OF ONE-HALF TO AMBROSE A. WINOT, OF SAME PLACE.

HYDRAULIC CABLE SAFETY DEVICE.

SPECIFICATION forming part of Letters Patent No. 682,536, dated September 10, 1901.

Application filed March 28, 1901. Serial No. 53,348. (No model.)

*To all whom it may concern:*

Be it known that I, WILLIAM A. DUNCANSON, a citizen of the United States, residing at Brockton, in the county of Plymouth and State of Massachusetts, have invented new and useful Improvements in Hydraulic Cable Safety Devices, of which the following is a specification.

This invention relates to improvements in hydraulic cable safety devices, and it is particularly adapted for use on anchor chains or cables for the purpose of preventing sudden shocks or strains on such anchor chain or cable, liable to part it, loosening the anchor, and causing the vessel to drift when anchored. It is likewise useful on tow-lines, particularly when a vessel is towed by another in a storm or heavy weather, and it may also to advantage be used in connection with the main sheet or other ropes on vessels liable to sudden shocks or strains, as will hereinafter be more fully shown and described, reference being had to the accompanying drawings, wherein—

Figure 1 represents a side elevation of the invention shown as applied to an anchor-chain or ships-cable. Fig. 2 represents a central longitudinal section of the same. Fig. 3 represents a cross-section on the line 3 3, shown in Fig. 2. Fig. 4 represents a cross-section on the line 4 4, shown in Fig. 2; and Fig. 5 represents a cross-section on the line 5 5, shown in Fig. 2.

Similar letters refer to similar parts wherever they occur on the different parts of the drawings.

In the drawings, Fig. 1, A A represent the anchor chain, cable, sheet, or other rope liable to sudden shocks or strains. Intermediate between the ends of such chain, &c., is arranged my improved device, which consists of a hollow metal tube or cylinder B, to one end of which is secured, preferably, a screw-threaded cap or head C, having an eye C', to which one end of the chain or cable A is connected. The opposite end of said cylinder is open, and within such open end is guided a cylindrical plunger D, having attached to its outer end an eyebolt E, connected to the other end of the chain or cable A, as shown.

Within the cylinder B is fitted tightly a centrally-perforated cylindrical block or diaphragm F, secured within said cylinder, preferably by means of screws $f$ $f$. (Shown in Figs. 1, 2, and 4.) Within the opposite end of said cylinder B is arranged a longitudinally-movable piston G, to which is secured the central piston-rod H, the opposite end of which, after passing through and guided in the centrally-perforated block or diaphragm F, is secured to the inner end of the plunger D, as shown in Fig. 2.

Within the cylinder B is arranged, between the stationary block F and movable piston G, a compressible coiled spring I. (Shown in Fig. 2.) Through the piston G are made one or more longitudinal perforations or conduits $g$ $g$, for a purpose as will hereinafter be described.

The interior of the cylinder B between the the stationary block F and piston G contains a liquid K, preferably oil, glycerin, petroleum, or other suitable liquid.

L is a perforation through the head C, which perforation is normally kept closed by means of a removable screw $l$. (Shown in Fig. 2.) By removing the said screw $l$ the liquid may be poured through the perforation L into the cylinder B, thus charging the latter with the desired liquid. After the cylinder has been charged with the liquid the opening L is closed by means of the screw $l$, as shown by Fig. 2.

M is a slack portion of a chain or cable attached in its ends to the chain or cable A on opposite ends of the cylinder B, as shown in Fig. 1.

The operation is as follows: As the anchor chain or cable A is strained the plunger D and its rod H, with the piston G, are caused to move relative to the cylinder B in the direction of the arrow shown on the plunger D in Fig. 2, causing the liquid in the cylinder to be compressed and gradually forced through the piston-perforations $g$ $g$ into the space between the piston G and head C, and during such operation the liquid acts as a cushion in counteracting and relieving any undue or sudden strain or pull on the chain or cable. The spring I during such movement is also compressed, and it serves the purpose of gradually returning the piston G to its normal position (shown in Fig. 2) when the strain on the chain or cable is released, and during such return motion of the piston and its connected parts the liquid in the space between the piston G and head C is forced by the spring I through the piston-perforations $g\ g$ into the space between the said piston G and collar or diaphragm F, as shown in Fig. 2. The chain M serves as a device to limit the outward movement of the plunger D and its connected parts, and it also serves as a safety device to prevent the anchor chain or cable from parting in case of accidental breakage or injury to the hydraulic safety device or its connected parts.

The invention is very simple in construction, composed of very few parts, and is particularly well adapted for the purpose hereinabove described.

What I wish to secure by Letters Patent and claim is—

The herein-described hydraulic cable safety device, consisting in combination, a cylinder connected in one end to the chain or cable and having a yielding plunger arranged in its opposite end, and connected to the chain or cable, a centrally-perforated block or diaphragm secured within said cylinder, a piston-rod secured in one end to said plunger and in its opposite end to a perforated piston, a compressible spring and a liquid contained in the space between said piston and diaphragm, and a chain M connected to the main chain or cable at opposite ends of the safety device, substantially as and for the purpose set forth.

In testimony whereof I have hereunto set my hand in presence of two subscribing witnesses.

WILLIAM A. DUNCANSON.

Witnesses:
ALBAN ANDRÉN,
AMBROSE A. WINOT.